3,213,095
N-BENZYLATION OF ADENINE
Ronald Edward Bambury, Trenton, and Marie Siewierski, South River, N.J., assignors to American Cyanamid Company, Stamford, Conn., a corporation of Maine
No Drawing. Filed Apr. 4, 1963, Ser. No. 270,528
6 Claims. (Cl. 260—252)

This invention relates to a new method of preparing 6-benzylaminopurine and substituted 6-benzylaminopurine compounds.

In the past, several methods for preparing 6-(substituted amino)-purines have been described in the literature and thus are well known, however, to date no entirely satisfactory method has been described. Certain known processes have the disadvantage that they require costly and difficult to prepare starting materials. Other processes require constant attention and control during preparation and the use of a substantial amount and variety of apparatus. Still others suffer from extremely low yields, employ unpleasant and/or toxic materials and involve rather dangerous reactions.

It is, therefore, an advantage of this invention to provide an extremely simple method for the preparation of the desired compounds in good yield and high purity.

It is also a further advantage of this invention to provide a simple method for the preparation of the desired compounds requiring only inexpensive, easily obtained, starting materials and simple apparatus.

We have now found that compounds of the following formula can be prepared by the novel process of the present invention:

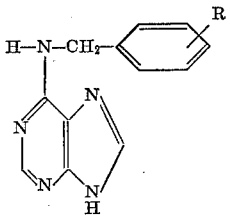

wherein R is selected from the group consisting of hydrogen, halogen, lower alkyl and lower alkoxy.

The preparation of the purines of the present invention may be illustrated by the following equation:

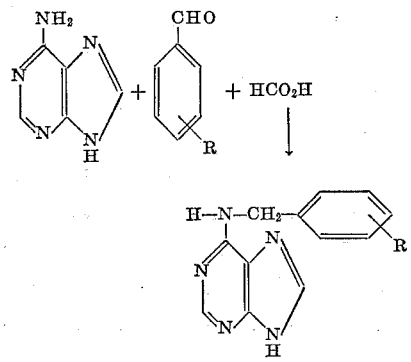

wherein R is selected from the group consisting of hydrogen, halogen, lower alkyl and lower alkoxy.

The present invention involves the steps of mixing adenine and an appropriate aromatic aldehyde such as benzaldehyde, p-chlorobenzaldehyde, 3-methylbenzaldehyde, 3-ethoxybenzaldehyde, 4-methylbenzaldehyde or the like with formic acid, heating the mixture to reflux temperature, refluxing the mixture at atmospheric or above atmospheric pressure until the product is formed and then separating the unreacted materials from the product. The product may be washed and purified, as by recrystallization from ethanol, ethylene glycol monomethyl ether or the like.

Adenine (6-aminopurine) is a well known commercially available intermediate which can be synthesized from, for example, uric acid. The various aldehydes used in the present process are readily available as well as formic acid. Furthermore, the process may be carried out in standard manufacturing equipment.

While the essential reactions for the preparation of the above compounds may be carried out at standard pressure and temperatures between about 100° C. to 200° C., higher temperatures and super atmospheric pressures may be used. Under the latter conditions, it is found that the reactions generally proceed more rapidly. The reaction time may vary from ½ to 10 days depending on the temperature and pressure used.

Illustrative of the compounds which may be prepared by this unique but simple process are 6-benzylaminopurine, 6 - (p-chlorobenzylamino)-purine, 6-(3'-methylbenzylamino)-purine, 6-(4'-ethylbenzylamino)-purine, 6-(3'-ethoxybenzylamino)-purine and the like.

The compounds prepared by the method involved in the subject invention are useful for preserving the color and edibility of edible plant material suitable for human consumption. The shipping of vegetables, particularly green vegetables from California to the East coast and also from Texas and Florida to the northern part of the country is an ever increasing business. The arrival at destination of such vegetables in the best salable condition is the desire of both growers and shippers. The present compounds in extremely small quantities preserve freshness and are relatively non-toxic. A method of preparing these compounds, suitable for commercial production, is highly desirable and is represented by the present process.

The following examples are illustrative of the invention but should not be construed as limiting the same.

EXAMPLE I

Preparation of 6-benzylaminopurine

A mixture of 13.5 grams (0.10 mole) of adenine, 15.2 grams (0.12 mole) of benzaldehyde, and 25 ml. of 98–100% formic acid is stirred and heated at refluxing temperatures for one week. The formic acid is evaporated under reduced pressure and the resulting viscous material is treated with 200 ml. of ether. The product turns solid and the mixture is filtered. The solid is stirred with 300 ml. of boiling water for two hours. The insoluble 6-benzylaminopurine is filtered from the hot mixture and recrystallized from absolute ethanol. The yield of product is 11.9 grams (53.0%), melting point 229–231.5° C.

EXAMPLE II

*Preparation of 6-(p-chlorobenzylamino)-purine*

A mixture of 13.5 grams (0.10 mole) of adenine, 16.9 grams (0.12 mole) of p-chlorobenzaldehyde, and 25 ml. of 98–100% formic acid is stirred and heated at the reflux temperature for four days. After cooling, the mixture is filtered and the resulting solid is washed with ether to remove unreacted p-chlorobenzaldehyde. The solid is stirred with 300 ml. boiling water for one hour. The mixture is filtered hot and the filter cake of insoluble 6-(p-chlorobenzylamino)-purine is recrystallized from absolute ethanol. The yield based on unreacted adenine (8.2 grams), recovered from the hot water wash is 47%, melting point 278–280° C.

EXAMPLE III

*Preparation of 6-(3'-methylbenzylamino)-purine*

A mixture of 13.5 grams (0.10 mole) of adenine, 17.0 grams (0.12 mole) of 3-methylbenzaldehyde and 25 ml. of 98–100% formic acid is stirred and heated at the reflux temperature and atmospheric pressure for one week. At the end of the week, the formic acid is evaporated under reduced pressure and the residue filtered. The crude mixture remaining is washed with ether to remove unreacted 3-methylbenzaldehyde and then stirred with boiling water for one hour. The hot mixture is filtered to recover the product, 6-(3'-methylbenzylamino)-purine which is then recrystallized to obtain a substantially pure product.

EXAMPLE IV

*Preparation of 6-(4'-ethylbenzylamino)-purine*

A mixture of 27 grams (0.20 mole) of adenine, 38.1 grams (0.24 mole) of 4-ethylbenzaldehyde and 50 ml. of 98–100% formic acid are stirred and heated at the reflux temperature and atmospheric pressure for five days. At the end of this period, the formic acid is evaporated under reduced pressure and the remaining mixture is washed with 400 ml. of ether to remove unreacted aldehyde. The washed material is then placed in a beaker with 600 ml. of water and boiled for one hour. The mixture is filtered while hot and filter cake recrystallized to yield a purified product.

EXAMPLE V

*Preparation of 6-(3'-ethoxybenzylamino)-purine*

The compound described above is prepared by heating at the reflux temperatures and at three atmospheres pressure, a mixture of 27.0 grams (0.20 mole) of adenine, 31.1 grams (0.24 mole) of 3-ethoxybenzaldehyde and 50 ml. of 98–100% formic acid. The mixture is refluxed for 2½ days then stripped of formic acid by evaporation under reduced pressure. The remaining material is permitted to cool and washed with about 400 ml. of ether to remove unreacted 3-ethoxybenzaldehyde. The solid is transferred to a beaker containing 600 ml. of water and boiled at atmospheric pressure for about one hour. The hot mixture is filtered and the product recrystallized from absolute ethanol.

We claim:

1. A method of preparing a purine compound of the formula:

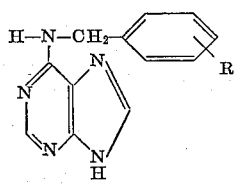

wherein R is selected from the group consisting of hydrogen, halogen, lower alkyl and lower alkoxy, which comprises mixing adenine with a benzaldehyde of the general formula:

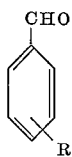

wherein R is as defined above, in the presence of formic acid, heating the mixture to at least about 100° C., maintaining said mixture at said temperature until the said purine compound is formed and separating the compound therefrom.

2. A method of preparing a purine compound of the formula:

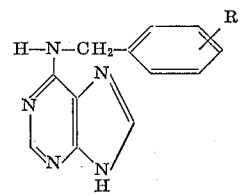

wherein R is selected from the group consisting of hydrogen, halogen, lower alkyl and lower alkoxy which comprises mixing adenine with a benzaldehyde of the formula:

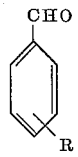

wherein R is as defined above in the presence of formic acid, heating the mixture under super atmospheric pressure to above about 100° C., maintaining the reaction mixture at said temperature and pressure until said purine compound is formed and recovering the compound therefrom.

3. A method of preparing a purine compound of the formula:

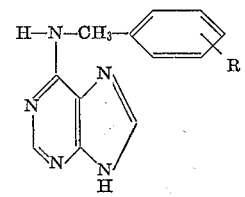

wherein R is selected from the group consisting of hydrogen, halogen, lower alkyl and lower alkoxy, comprising mixing adenine with a benzaldehyde of the formula:

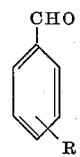

wherein R is as defined above in the presence of formic acid, heating the mixture to refluxing temperature, refluxing said mixture until a substantial amount of said purine compound is formed and separating said compound from the reaction mixture.

4. A method of preparing 6-benzylaminopurine comprising admixing substantially equimolar quantities of adenine and benzaldehyde, adding thereto a molar excess of formic acid, heating said mixture to at least about 100° C. temperature and recovering said compound therefrom.

5. A method of preparing p-chloro-6-benzylaminopurine which comprises mixing substantially equimolar quantities of adenine and p-chlorobenzaldehyde with a molar excess of formic acid, heating the mixture to above about 100° C., maintaining said mixture at said temperature until p-chloro-6-benzylaminopurine is formed and separating the product from the reaction mixture.

6. A method of preparing 6-(3'-methylbenzylamino)-purine which comprises mixing substantially equimolar quantities of adenine and 3-methylbenzylaldehyde with a molar excess of formic acid, heating the mixture to a temperature of at least 100° C. and maintaining said temperature until a substantial amount of 6-(3'-methylbenzylamino)-purine is formed and recovering said compound therefrom.

No references cited.

NICHOLAS S. RIZZO, *Primary Examiner.*